(12) United States Patent
Mannan et al.

(10) Patent No.: US 10,837,787 B2
(45) Date of Patent: Nov. 17, 2020

(54) METHOD AND SYSTEM FOR ALLOCATING CO-PASSENGERS IN RIDE-SHARING SYSTEMS

(71) Applicant: ANI Technologies Private Limited, Karnataka (IN)

(72) Inventors: Azimul Mannan, Karnataka (IN); Moiaz Jiwani, Chattisgarh (IN)

(73) Assignee: ANI Technologies Private Limited, Bengaluru (IN)

(*) Notice: Subject to any disclaimer, the term of this patent is extended or adjusted under 35 U.S.C. 154(b) by 294 days.

(21) Appl. No.: 15/958,790

(22) Filed: Apr. 20, 2018

(65) Prior Publication Data

US 2019/0195642 A1 Jun. 27, 2019

(51) Int. Cl.
*G01C 21/34* (2006.01)
*G06Q 10/02* (2012.01)
*G06Q 30/02* (2012.01)
*G06Q 50/30* (2012.01)

(52) U.S. Cl.
CPC ......... *G01C 21/3438* (2013.01); *G06Q 10/02* (2013.01); *G06Q 30/0284* (2013.01); *G06Q 50/30* (2013.01)

(58) Field of Classification Search
CPC ................................................. G01C 21/3438
See application file for complete search history.

(56) References Cited

U.S. PATENT DOCUMENTS

| | | | | |
|---|---|---|---|---|
| 7,080,019 | B1* | 7/2006 | Hurzeler | G06Q 10/025 705/6 |
| 8,688,532 | B2* | 4/2014 | Khunger | G01C 21/3438 705/26.1 |
| 8,880,601 | B2 | 11/2014 | Boskovic | |
| 9,939,279 | B2* | 4/2018 | Pan | G01C 21/3438 |
| 2008/0167892 | A1* | 7/2008 | Clark | G06Q 30/06 705/1.1 |
| 2009/0248587 | A1 | 10/2009 | Van Buskirk | |
| 2010/0205017 | A1* | 8/2010 | Sichelman | G06Q 10/02 705/5 |

(Continued)

FOREIGN PATENT DOCUMENTS

| | | |
|---|---|---|
| CN | 104616105 A | 5/2015 |
| KR | 20170083863 A | 7/2017 |

OTHER PUBLICATIONS

Hitch-A-Ride (Social Ridesharing App for iOS), Hitch-A-Ride Enterprises Pty Ltd, http://hitcharide.me.
Orahi ride sharing application, https://www.orahi.com/.

*Primary Examiner* — Thomas G Black
*Assistant Examiner* — Tarek Elarabi
(74) *Attorney, Agent, or Firm* — Chip Law Group (57) ABSTRACT

A method and a system for allocating co-passengers in a ride-sharing system is provided. A shared-ride request is received from a passenger device of a passenger along with one or more phone numbers of one or more individuals associated with the passenger. An approval status of each of the one or more phone numbers is determined. A priority is assigned to each of the one or more phone numbers. A co-passenger from the one or more individuals for the shared-ride is identified based on one of the determined approval status or the assigned priority of the phone number associated with the co-passenger. A shared-ride fare is determined for the passenger for the shared-ride with the identified co-passenger.

20 Claims, 7 Drawing Sheets

(56) References Cited

U.S. PATENT DOCUMENTS

| | | | |
|---|---|---|---|
| 2011/0059693 A1* | 3/2011 | O'Sullivan | G06Q 10/025 |
| | | | 455/41.1 |
| 2015/0204684 A1 | 7/2015 | Rostamian et al. | |
| 2016/0027307 A1* | 1/2016 | Abhyanker | G08G 1/005 |
| | | | 701/117 |
| 2016/0110836 A1* | 4/2016 | Garg | G06Q 20/405 |
| | | | 705/13 |
| 2018/0033058 A1* | 2/2018 | Mukherjee | G06Q 30/0282 |
| 2018/0211541 A1* | 7/2018 | Rakah | G06Q 50/30 |
| 2018/0231984 A1* | 8/2018 | Alonso-Mora | G05D 1/0291 |
| 2019/0206010 A1* | 7/2019 | Sharma | H04W 4/029 |

* cited by examiner

SHARE YOUR EXPERIENCE WITH US

RATE YOUR CO-PASSENGERS

CO-PASSENGER NAME: ABC PQR

DISTANCE SHARED: KMS

DESTINATION SHARED: ADDRESS

COMMENTS:
___________
___________

CO-PASSENGER RATING: ★★★★★

WOULD YOU LIKE TO SHARE RIDE WITH ABC PQR AGAIN?

○ YES      ○ NO

NOTIFY ME WHEN ABC PQR HAS BOOKED A SHARE RIDE CROSSING MY LOCATION.

○ YES      ○ NO

[SUBMIT]

---

CO-PASSENGER NAME: XYZ EFG

DISTANCE SHARED: KMS

DESTINATION SHARED: ADDRESS

COMMENTS:
___________
___________

CO-PASSENGER RATING: ★★★★★

WOULD YOU LIKE TO SHARE RIDE WITH XYZ EFG AGAIN?

○ YES      ○ NO

NOTIFY ME WHEN XYZ EFG HAS BOOKED A SHARE RIDE CROSSING MY LOCATION.

○ YES      ○ NO

[SUBMIT]

METHOD AND SYSTEM FOR ALLOCATING CO-PASSENGERS IN RIDE-SHARING SYSTEMS

CROSS-RELATED APPLICATIONS

This application claims priority of Indian Application Serial No. 201721046882, filed Dec. 27, 2017, the contents of which are incorporated herein by reference.

FIELD OF THE INVENTION

The present invention relates generally to ride-sharing systems, and more particularly, to a method and a system for allocating co-passengers in a ride-sharing system.

BACKGROUND

Generally, passengers avail various public and private transportation services for commuting to and from their work places, or when the passengers are engaged in personal activities, such as outstation travel. In modern cities, vehicle transit systems play an important role by providing on-demand vehicle services to the passengers to travel to their desired destination locations.

Bookings of the vehicles are usually performed on individual basis, in which a customer or a small group of customers travelling towards the same destination book a vehicle. When bookings are made on individual basis, most of the vehicles tend to travel long distances with minimum occupancy. Thus, at any given time, the roads are crowded with the vehicles, which leads to an increase in carbon dioxide ($CO_2$) emissions from the vehicles. The increase in $CO_2$ emissions adversely affects the environment. To overcome this, the vehicle transit systems facilitate sharing of rides among two or more passengers. In such shared ride scenarios, two or more passengers can book vehicles on a shared-basis.

On a shared-basis, multiple passengers travelling along the same route share a vehicle. When bookings are made on a shared basis, a ride-fare is divided among the multiple passengers sharing the vehicle. Thus, a passenger has to spend less money as compared to when the passenger books the vehicle on an individual basis. Further, in ride-sharing scenarios, the number of vehicles on the road at any given time decreases. Due to this, there is a decrease in the $CO_2$ emissions from the vehicles, which reduces the adverse effects on the environment.

However, the passenger might not be comfortable sharing the vehicle with strangers as co-passengers. The shared-ride experience of the passenger can improve if the passenger was to share the vehicle with family, friends, and acquaintances, as the co-passengers. The passengers would feel more comfortable and enjoy sharing the vehicle with family, friends, and acquaintances as compared to sharing the vehicle with strangers. Further, the passenger would prefer booking a vehicle from a vehicle service provider that allows the passenger to share the vehicle with family, friends, and acquaintances, resulting in increased business for the vehicle service provider.

In light of the foregoing, there exists a need for a technical and more reliable solution that solves the above-mentioned problems and manages the allocation of the co-passengers in the ride-sharing system that improves the shared-ride experience of the passenger in a shared-ride.

SUMMARY

Various embodiments of the present invention provide a method and a system for allocating co-passengers in a ride-sharing system. The method includes one or more operations that are executed by circuitry of the system to allocate co-passengers in the ride-sharing system. The circuitry receives a ride request for a shared-ride from a passenger device of a passenger over a communication network. The circuitry retrieves one or more phone numbers of one or more individuals associated with the passenger over the communication network. The phone numbers are retrieved from a storage server or the passenger device in real-time in response to the received ride request. The individuals may be friends, family members, or acquaintances of the passenger. The circuitry determines an approval status of each phone number based on an approval message corresponding to the phone numbers as provided by the passenger.

The circuitry assigns a priority to each phone number based on a corresponding weight, which is determined based on one or more factors associated with the passenger and an individual associated with the phone number. The factors include a frequency of historical calls between the passenger and the individual, a time duration of the historical calls, the passenger's preference for the individual, a rating of the individual, a number of historical rides travelled together, and a distance of the number of historical rides. The circuitry identifies a co-passenger from the individuals for the shared-ride based on the determined approval status or the assigned priority of the phone number associated with the co-passenger. The circuitry determines a shared-ride fare for the passenger for the shared-ride with the identified co-passenger, based on the one or more factors associated with the passenger and the identified co-passenger.

The circuitry further renders a first user interface on the passenger device. The first user interface presents shared-ride information of the shared-ride including at least one of a destination address of the identified co-passenger, a time duration for which the passenger and the identified co-passenger are travelling together in the shared-ride, or the determined shared-ride fare. The shared-ride information of the shared-ride further includes at least one of a time duration and a distance for which the identified co-passenger had travelled together with the passenger, a most recent time for which the identified co-passenger had travelled with the passenger, a rating of the identified co-passenger, or a most recent synchronization of historical calls between the passenger and the identified co-passenger. The first user interface further presents various options selectable by the passenger. The passenger can accept the identified co-passenger for the shared-ride. The passenger can execute an automatic allocation for the shared-ride. The circuitry receives the selection made by the passenger over the communication network and allocates a shared-ride vehicle for the shared-ride requested by the passenger based on the received response.

The circuitry further renders a second user interface on the passenger device. The second user interface presents an electronic feedback document for receiving a shared-ride experience of the passenger in the shared-ride. The electronic feedback document includes at least one of a title of the electronic feedback document, a first allocated co-passenger information section, or a second allocated co-passenger information section. The first allocated co-passenger information section includes at least one of a name of the first allocated co-passenger, a distance shared by the passenger with the first allocated co-passenger, a destination address of the first allocated co-passenger, or a co-passenger rating section. The second allocated co-passenger information section includes at least one of a name of the second allocated co-passenger, a distance shared by the passenger with the second allocated co-passenger, a destination address of the second allocated co-passenger, or the co-passenger rating section. Thus, the method and the system of the present invention provide a choice to the passenger to share a ride with friends, family members, or acquaintances. Further, the method and the system of the present invention provide differential pricing for the passenger based on the choice. The choice further improves the shared-ride experience of the passenger with a transport service providing the shared-ride vehicle.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice-versa.

Further areas of applicability of the present invention will become apparent from the detailed description provided hereinafter. It should be understood that the detailed description of exemplary embodiments are intended for illustration purposes only and are, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for allocating co-passengers based on the preference of a passenger and for improving a shared-ride experience of the passenger in a ride-sharing system. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A vehicle is a means of transport that is deployed by a vehicle transit system, such as a vehicle service provider, to provide vehicle services to passengers. For example, the vehicle is an automobile, a bus, a car, a bike, and the like. The passengers may travel in the vehicle to commute between source and destination locations. Hereinafter, various methods of providing the vehicle services to the passengers by the vehicle transit system have been described that will become apparent to a person having ordinary skill in the relevant art.

Figure 1:
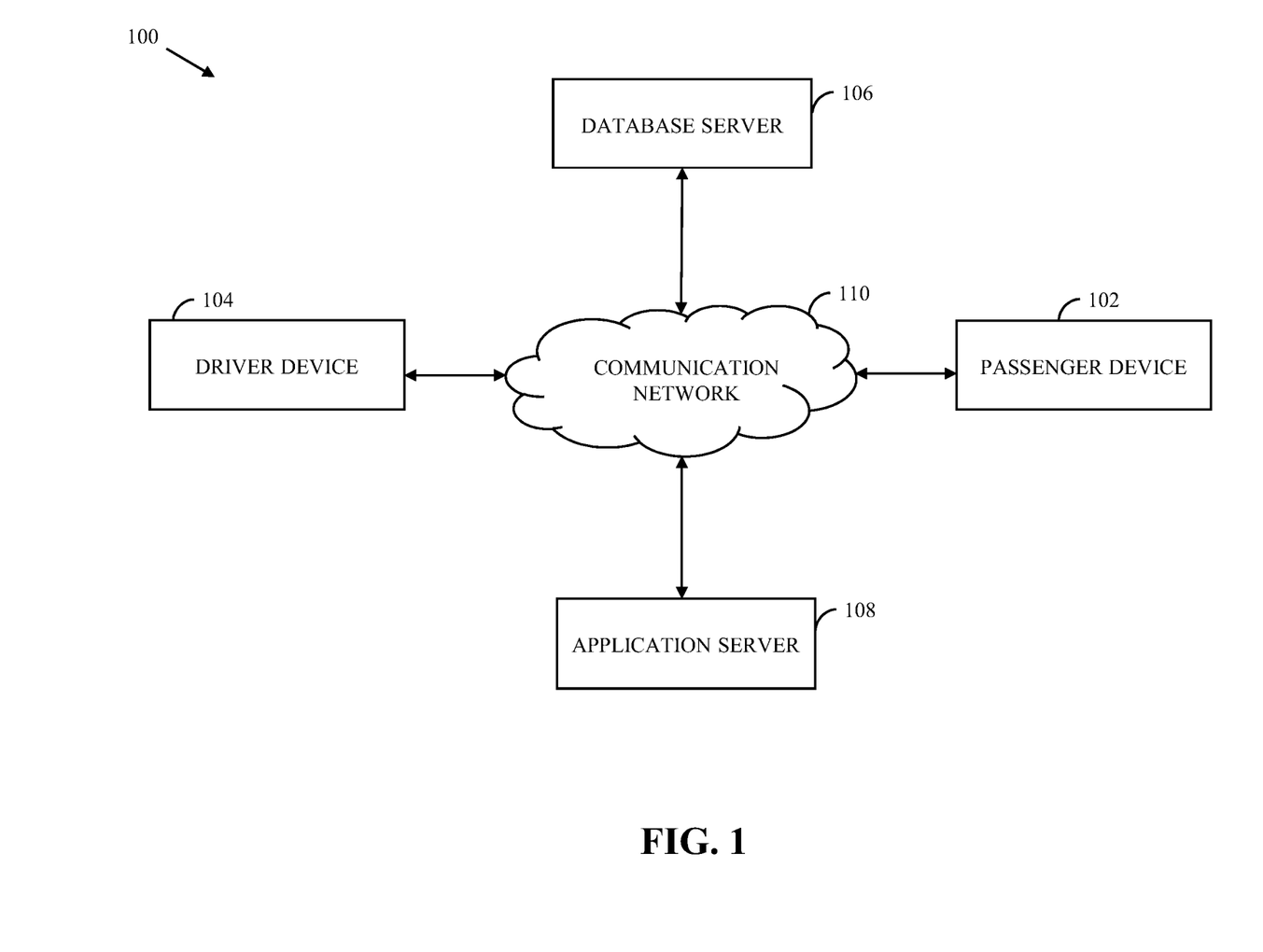
FIG. 1 is a block diagram that illustrates an environment in which various embodiments of the present invention are practiced.

Referring now to FIG. 1, a block diagram that illustrates an environment 100 in which various embodiments of the present invention are practiced. The environment 100 includes a passenger device 102, a driver device 104, a storage server 106 (hereinafter interchangeably referred to as "database server 106"), and an application server 108 that communicate with each other by way of a communication network 110. Examples of the communication network 110 include, but are not limited to, wireless fidelity (Wi-Fi) network, a light fidelity (Li-Fi) network, a satellite network, the Internet, a mobile network such as cellular data network, high speed packet access (HSPA), or any combination thereof.

The passenger device 102 is a computing device that is used by a passenger to perform various activities. For example, the passenger uses the passenger device 102 to transmit a ride request for a shared-ride between a plurality of locations including source and destination locations by means of a service application installed on the passenger device 102. To schedule the shared-ride, the passenger inputs details of the ride request including at least one of the source address, the destination address, a vehicle type, a time of travel, and the like by means of the service application. In a scenario when a pick-up location of the passenger is the same as the source location, the passenger may not input the source address. In such a scenario, a source address of the source location is automatically captured by the application server 108 based on Global Positioning System (GPS) information transmitted by the passenger device 102 over the communication network 110. However, if the pick-up location is different from the captured source address, the passenger may manually input the pick-up address in the service application.

Further, the service application accesses one or more phone numbers of one or more individuals that are stored on the passenger device 102, for example, from an address book or a 'contacts' application of the passenger device 102. Examples of the individuals include friends, family members, and acquaintances of the passenger. The service application may also access other details associated with the phone numbers. The service application transmits the phone numbers and the other details to the database server 106 over the communication network 110. The other details include, but are not limited to, a frequency of historical calls between the passenger and the individuals, a total time duration of the historical calls, and phone numbers from the phone numbers that are marked as 'favorites'. In an embodiment of the present invention, the service application accesses the phone numbers and the other details at the time of installation of the service application and further performs periodical automatic synchronization of the phone numbers and the other details with the database server 106. In another embodiment, the passenger can transmit the phone numbers and the other details to the database server 106 via the passenger device 102. In yet another embodiment, the passenger can perform manual synchronization of the phone numbers and the other details to the database server 106 after the installation of the service application. The passenger performs the manual synchronization via a synchronization option offered by the service application. Examples of the passenger device 102 include, but are not limited to, a personal computer, a laptop, a smartphone, a tablet computer, and the like. The passenger device 102 has been described in detail in conjunction with FIG. 2.

The driver device 104 is a computing device that is used by the driver of the selected vehicle to perform various activities. For example, the driver uses the driver device 104 to view an upcoming booking request that has been directed by the application server 108 based on the received ride request from the passenger device 102. The driver further uses the driver device 104 to view a route between the source and destination addresses provided by the application server 108 or a third-party server (not shown) over the communication network 110. In an exemplary embodiment, the driver device 104 may be a vehicle head unit. In another exemplary embodiment, the driver device 104 may be a communication device, such as a smartphone, a personal digital assistant (PDA), a tablet, or any other portable communication device, that is placed in the vehicle.

The database server 106 is a data management and storage server that manages and stores passenger information of the passengers. The database server 106 includes a processor (not shown) and a memory (not shown) for managing and storing the passenger information. In an embodiment, for managing and storing the passenger information, the processor receives historical shared-ride data of the passengers from corresponding passenger devices, and stores it in the memory. The historical shared-ride data of the one or more passenger includes historical ratings of the passengers, a total number of historical shared-rides of the passengers, a total distance of the historical shared-rides, and the like. The processor may receive the phone numbers and the other details from all passenger devices registered with the vehicle service provider. In one example, the processor receives the phone numbers and the other details from the passenger device 102. Further, in an embodiment, the database server 106 may receive a query from the application server 108 over the communication network 110, to retrieve information associated with a passenger. The database server 106, in response to the query, transmits the requested information to the application server 108 over the communication network 110. The information transmitted by the database server 106 includes the phone numbers of individuals and the other details associated with the phone numbers. The individuals are associated with the passenger. The information transmitted by the database server 106 further includes the historical shared-ride data of the individuals, when travelling with the passenger in past shared-rides. Examples of the database server 106 include, but are not limited to, a personal computer, a laptop, or a network of computer systems.

The application server 108 is a computing device, a software framework, or a combination thereof, that may provide a generalized approach to create the application server implementation. In an embodiment, the operation of the application server 108 may be dedicated to execution of procedures, such as, but not limited to, programs, routines, or scripts stored in one or more memories for supporting its applied applications. In an embodiment, the application server 108 receives the ride request from the passenger device 102 over the communication network 110. Similarly, the application server 108 receives ride requests for shared-rides from passenger devices registered with the service. The application server 108 sends the query to the database server 106 over the communication network 110, to retrieve information required to identify a co-passenger from the individuals for the shared-ride. The application server 108 identifies, from the ride requests, ride requests originating from corresponding passenger devices of the individuals.

In an example, the ride requests may have source addresses within a predetermined threshold distance of the source address of the passenger and destination addresses same as that of the source and destination addresses of the passenger. In another example, the ride requests may have source addresses within the predetermined threshold distance of the source address of the passenger and destination addresses along the route of the destination address of the passenger. In yet another example, the ride requests may have source addresses within the predetermined threshold distance of the source address of the passenger and destination addresses within the predetermined threshold distance of the destination address of the passenger. The application server 108 further identifies the co-passenger and determines a shared-ride fare for the passenger of the passenger device 102 based on the information retrieved from the database server 106.

The application server 108 renders a first user interface in a first scenario on the passenger device 102 over the communication network 110. The first user interface may present various options selectable by the passenger, the determined shared-ride fare, and the retrieved information from the database server 106. The passenger may select an option on the first user interface of the passenger device 102. In response to the selection, the application server 108 allocates a co-passenger and a shared-ride vehicle to the passenger. In an example, the application server 108 allocates the identified individual as the co-passenger. In another example, the application server 108 allocates an individual other than the identified individual as the co-passenger.

The application server 108 also renders a second user interface on the passenger device 102 over the communication network 110, in a second scenario. The second user interface presents an electronic feedback document for receiving the passenger's feedback about a shared-ride availed by the passenger. In another embodiment, an allocation engine hosted on the application server 108 identifies the co-passenger and a pricing engine hosted on the application server 108 determines the shared-ride fare. Examples of the application server 108 include, but are not limited to, a personal computer, a laptop, or a network of computer systems. The application server 108 may be realized through various web-based technologies such as, but not limited to, a Java web-framework, a .NET framework, a PHP framework, or any other web-application framework. The various operations of the application server 108 have been described in detail in conjunction with FIGS. 2, 5A, and 5B. The first and second user interfaces have been described in detail in conjunction with FIGS. 3 and 4, respectively.

Figure 2:
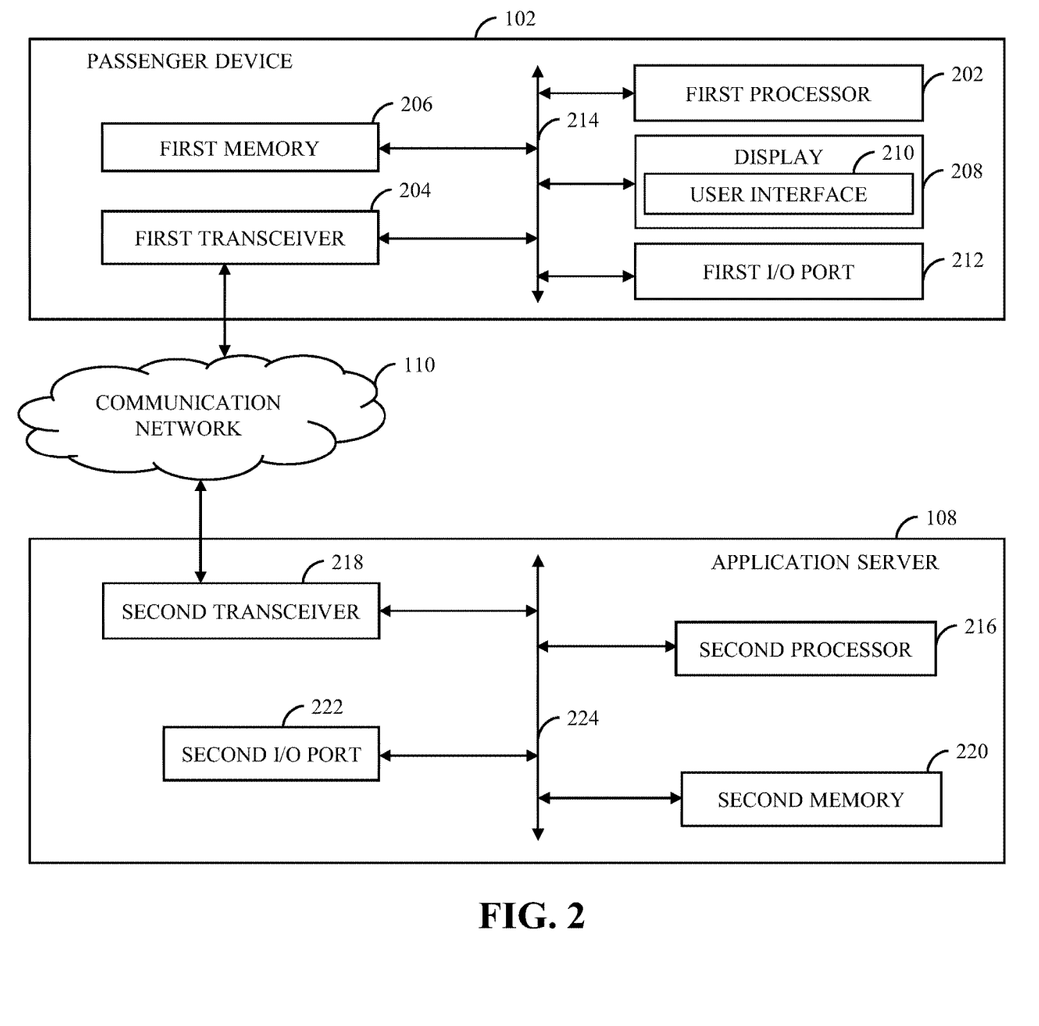
FIG. 2 is a block diagram that illustrates various components of the passenger device and the application server of the environment of FIG. 1, in accordance with an embodiment of the present invention.

Referring now to FIG. 2, a block diagram that illustrates various components of the passenger device 102 and the application server 108 of the environment 100 of FIG. 1, in accordance with an embodiment of the present invention is shown. The passenger device 102 includes circuitry, such as a first processor 202, a first transceiver 204, a first memory 206, a display 208 capable of rendering a graphical user interface (GUI) such as a user interface 210, and a first input/output (I/O) port 212 that communicate with each other by way of a first communication bus 214. The application server 108 includes circuitry, such as a second processor 216, a second transceiver 218, a second memory 220, and a second I/O port 222 that communicate with each other by way of a second communication bus 224. The user interface 210 includes the first and second user interfaces as described in the foregoing.

The first processor 202 includes suitable logic, circuitry, and/or interfaces that are operable to execute one or more instructions stored in the first memory 206 to perform one or more operations. For example, the first processor 202 transmits a first request to the second processor 216 by way of the first transceiver 204 over the communication network 110. The first request may be the ride request for the shared-ride initiated by the passenger for booking the shared-ride between the source and destination addresses. The first processor 202 captures and transmits GPS information of the passenger device 102 by means of one or more location-sensors (not shown) embedded in the passenger device 102. The first processor 202 receives instructions to render the first user interface, from the second processor 216, and renders the first user interface on the display 208. The first user interface presents the determined shared-ride fare and the retrieved information, in response to the received first request. The first user interface also presents the selectable options. The selectable options include first and second options, where the first option allows the passenger to select the identified co-passenger and the second option allows the passenger to select the automatic allocation of a co-passenger for the shared-ride. Based on these options displayed on the first user interface, the passenger makes the selection, and based on the selection, a second request is transmitted to the second processor 216.

The first processor 202 receives instructions to render the second user interface from the second processor 216, and renders the second user interface on the display 208. The second user interface presents the electronic feedback document for receiving the shared-ride experience. Examples of the first processor 202 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the first processor 202 is compatible with multiple operating systems. It will further be apparent that the first processor 202 may be compatible with multiple displays, for example, the display 208.

The first transceiver 204 includes suitable logic, circuitry, and/or interfaces that are operable to transmit (or receive) data to (or from) various devices, such as the second transceiver 218 over the communication network 110. For example, the first transceiver 204 transmits one or more requests, such as the first and second requests initiated by the passenger by means of the first I/O port 212, to the second transceiver 218 over the communication network 110. The first transceiver 204 receives the instructions to render one or more user interfaces, such as the first and second user interfaces including the determined shared-ride fare, the retrieved information, the various options that are selectable by the passenger, and the electronic feedback document for receiving the shared-ride experience, from the second transceiver 218 over the communication network 110. The first transceiver 204 further receives allocation information of the allocated co-passenger and the allocated shared-ride vehicle for the shared-ride from the second transceiver 218 over the communication network 110, and stores it in the first memory 206. The allocation information may include at least one of a name of the allocated co-passenger, a name of the driver of the allocated shared-ride vehicle, a vehicle identification number of the allocated shared-ride vehicle, a current status of the allocated shared-ride vehicle, or an expected time of arrival at the source address for the pick-up. Examples of the first transceiver 204 include, but are not limited to, an antenna, a radio frequency transceiver, a wireless transceiver, and a Bluetooth transceiver. The first transceiver 204 communicates with the communication network 110, the first processor 202, and the second transceiver 218 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The first memory 206 includes suitable logic, circuitry, and/or interfaces to store the one or more instructions that are executed by the first processor 202 to perform the one or more operations. The first memory 206 stores the phone numbers and the other details. The first memory 206 stores the allocation information of the allocated co-passenger and the allocated shared-ride vehicle for the shared-ride. Examples of the first memory 206 include, but are not limited to, a random-access memory (RAM), a read-only memory (ROM), a programmable ROM (PROM), and an erasable PROM (EPROM).

The display 208 includes suitable logic, circuitry, and/or interfaces that are operable to execute one or more instructions stored in the first memory 206 to perform one or more operations. For example, the display 208 displays one or more user interfaces, such as a booking interface (not shown) associated with the service application based on the input provided by the passenger. The display 208 further displays the first and second user interfaces. Examples of the display 208 include, but are not limited to, a TFT LCD, an IPS LCD, a Resistive Touchscreen LCD, a Capacitive Touchscreen LCD, an OLED, an AMOLED, a Super AMOLED, a Retina Display, and a Haptic/Tactile touchscreen.

The first I/O port 212 includes suitable logic, circuitry, and/or interfaces that are operable to execute one or more instructions stored in the first memory 206 to perform one or more operations. The first I/O port 212 may include input and output devices that are configured to operate under the control of the first processor 202 by way of the first communication bus 214. By means of the first I/O port 212, the passenger provides one or more inputs to perform the one or more operations. For example, the passenger may provide one or more inputs to open the service application on the passenger device 102, initiate requests for booking the shared-ride, and the like. Examples of the input devices may include a universal serial bus (USB) port, an Ethernet port, a real or virtual keyboard, a mouse, a joystick, a touch screen, a stylus, a microphone, and the like. Examples of the output devices may include the display 208, a speaker, headphones, a universal serial bus (USB) port, an Ethernet port, and the like.

The second processor 216 includes suitable logic, circuitry, and/or interfaces that are operable to execute one or more instructions stored in the second memory 220 to perform one or more operations. For example, the second processor 216 receives the first request from the first transceiver 204. In response to the received first request, the second processor 216 retrieves the information required to identify the co-passenger for the shared-ride from the database server 106 and stores the retrieved information in the second memory 220. The retrieved information includes the set of the phone numbers of individuals and the other details associated with the phone numbers and the historical shared-ride data of the individuals, when travelling with the passenger in past shared-rides. The second processor 216 further determines the shared-ride fare for the passenger.

After identifying the co-passenger and determining the shared-ride fare, the second processor 216 transmits the instructions to render the first user interface to the first processor 202 by means of the second transceiver 218. The first user interface presents at least one of the determined shared-ride fare, the various selectable options, and the retrieved information. The second processor 216 receives the second request from the first transceiver 204. The second processor 216 processes the second request to determine the option selected by the passenger. Based on the selected option, the second processor 216 performs one or more defined operations. For example, when the first option is selected, the second processor 216 allocates the identified co-passenger for the shared-ride. The second processor 216 executes the automatic allocation of the co-passenger, when the second option is selected. The second processor 216 provides the allocation information of the allocated co-passenger and the allocated shared-ride vehicle for the shared-ride to the second transceiver 218. At the end of the shared-ride, the second processor 216 transmits the instructions to render the second user interface to the first processor 202. Examples of the second processor 216 include, but are not limited to, an ASIC processor, a RISC processor, a CISC processor, and a FPGA. It will be apparent to a person skilled in the art that the second processor 216 is compatible with multiple operating systems.

The second transceiver 218 includes suitable logic, circuitry, and/or interfaces that are operable to transmit (or receive) data to (or from) various devices, such as the first transceiver 204 over the communication network 110. For example, the second transceiver 218 receives the one or more requests, such as the first and second requests, from the first transceiver 204. The second transceiver 218 transmits the instructions to render the one or more interfaces, such as the first and second user interfaces, to the first transceiver 204 over the communication network 110. The second transceiver 218 transmits the allocation information of the allocated co-passenger and the allocated shared-ride vehicle for the shared-ride to the first transceiver 204. Examples of the second transceiver 218 include, but are not limited to, an antenna, a radio frequency transceiver, a wireless transceiver, and a Bluetooth transceiver. The second transceiver 218 communicates with the communication network 110, the second processor 216, and the first transceiver 204 using various wired and wireless communication protocols, such as TCP/IP (Transmission Control Protocol/Internet Protocol), UDP (User Datagram Protocol), 2nd Generation (2G), 3rd Generation (3G), 4th Generation (4G) communication protocols, or any combination thereof.

The second memory 220 includes suitable logic, circuitry, and/or interfaces to store the one or more instruction that are executed by the second processor 216 to perform the one or more operations. The second memory 220 stores the retrieved information. In addition, the second memory 220 stores the one or more requests, such as the first and second requests, the allocation information of the allocated co-passenger, and the allocated shared-ride vehicle for the shared-ride. Examples of the second memory 220 include, but are not limited to, a RAM, a ROM, a PROM, and an EPROM.

The second I/O port 222 includes suitable logic, circuitry, and/or interfaces that are operable to execute one or more instructions stored in the second memory 220 to perform one or more operations. The second I/O port 222 may include various input and output devices that are configured to operate under the control of the second processor 216 by way the second communication bus 224. For example, by means of the second I/O port 222, an administrator associated with the application server 108 provides one or more inputs to perform the one or more operations. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a universal serial bus (USB) port, an Ethernet port, and the like.

Although the operation of FIGS. 1 and 2 describe the identification and allocation of one co-passenger for the shared-ride, it will be apparent to a person having ordinary skill in the art that the second processor 216 can identify two or more co-passengers and provide information associated with two or more co-passengers on the first user interface. Thus, the first user interface presents two or more examples of the first option. Further, it will also be apparent to a person having ordinary skill in the art that two or more co-passengers can be allocated for the shared-ride.

Figure 3:
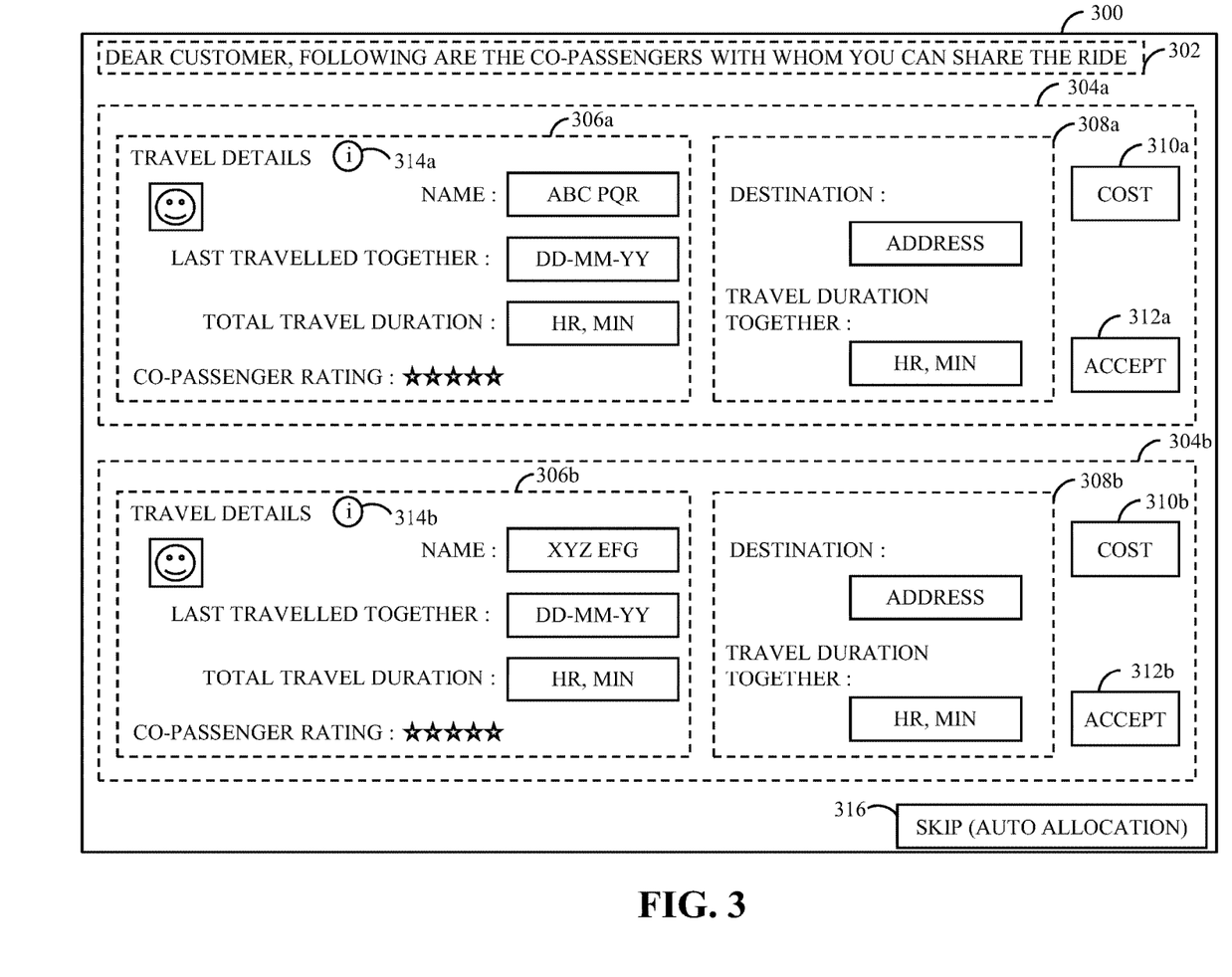
FIG. 3 is a block diagram that illustrates a user interface in a first scenario, in accordance with an embodiment of the present invention.

Referring now to FIG. 3, a block diagram that illustrates the user interface 210 of FIG. 2 in a first scenario, in accordance with an embodiment of the present invention is shown. In one example, the first scenario is a scenario during booking of the shared-ride. The first user interface 300 includes one or more sections, such as a welcome message 302, a first co-passenger information section 304a, and a second co-passenger information section 304b.

The first co-passenger information section 304a includes sections 306a and 308a, a first 'cost' display tab 310a, and a first 'accept' tab 312a. The section 306a includes the first identified co-passenger information, such as a name, an image, a co-passenger rating of the first identified co-passenger, a most recent time for which the first identified co-passenger had travelled with the passenger, a total time duration for which the first identified co-passenger had travelled with the passenger, and other historical travel details. The section 306a further includes a first shortcut 314a to preferably a first pop-up window (not shown). The first pop-up window may include a total distance for which the first identified co-passenger had travelled with the passenger, a most recent synchronization of historical calls between the passenger and the first identified co-passenger, and the other historical travel details. The section 308a includes a destination address of the first identified co-passenger and a time duration for which the passenger and the first identified co-passenger are travelling together in the shared-ride. When the user selects the first 'cost display' tab 310a, the determined shared-ride fare for the shared-ride with the first identified co-passenger is displayed, preferably in form of a pop-up window. The first 'accept' tab 312a is selectable by the passenger and allows the passenger to accept the first identified co-passenger for the shared-ride based on the information presented in the passenger information section 304a and passenger preferences. For example, the passenger may select the first 'accept' tab 312a if the passenger wishes to travel with the first identified co-passenger. After receiving the passenger selection, the second processor 216 allocates the first identified co-passenger for the shared-ride. In an embodiment, the first co-passenger information section 304a may further include a first 'reject' tab (not shown) to reject the first identified co-passenger. In another embodiment, there may be provided a 'blacklist' tab (not shown) that temporarily or permanently blacklists an identified co-passenger. In such a scenario, the identified co-passenger will not be shown the passenger as an available co-passenger, at the time the identified co-passenger makes a booking request. The second co-passenger information section 304b is similar in nature and functionality as that of the first co-passenger information section 304a, and further description thereof is avoided so as not to obfuscate the present specification.

The first user interface 300 further includes a 'skip' tab 316. The 'skip' tab 316 is selectable by the passenger and allows the passenger to skip the first and second identified co-passengers. When the passenger selects the 'skip' tab 316, the second processor 216 executes automatic allocation of the co-passenger for the shared-ride. For example, the passenger selects the 'skip' tab 316 if the passenger does not wish to travel with either of the first or second identified co-passengers. After receiving the passenger selection of the 'skip' tab 316, the second processor 216 randomly allocates the co-passenger for the shared-ride. In an embodiment, after rendering the first user interface 300, if the second processor 216 does not receive the input from the passenger for a predetermined time duration, the second processor 216 executes automatic allocation of the co-passenger for the shared-ride. A person having ordinary skill in the art will understand that the first user interface 300 may include multiple sections similar to the second and third sections 304a and 304b corresponding to multiple identified co-passengers.

Figure 4:
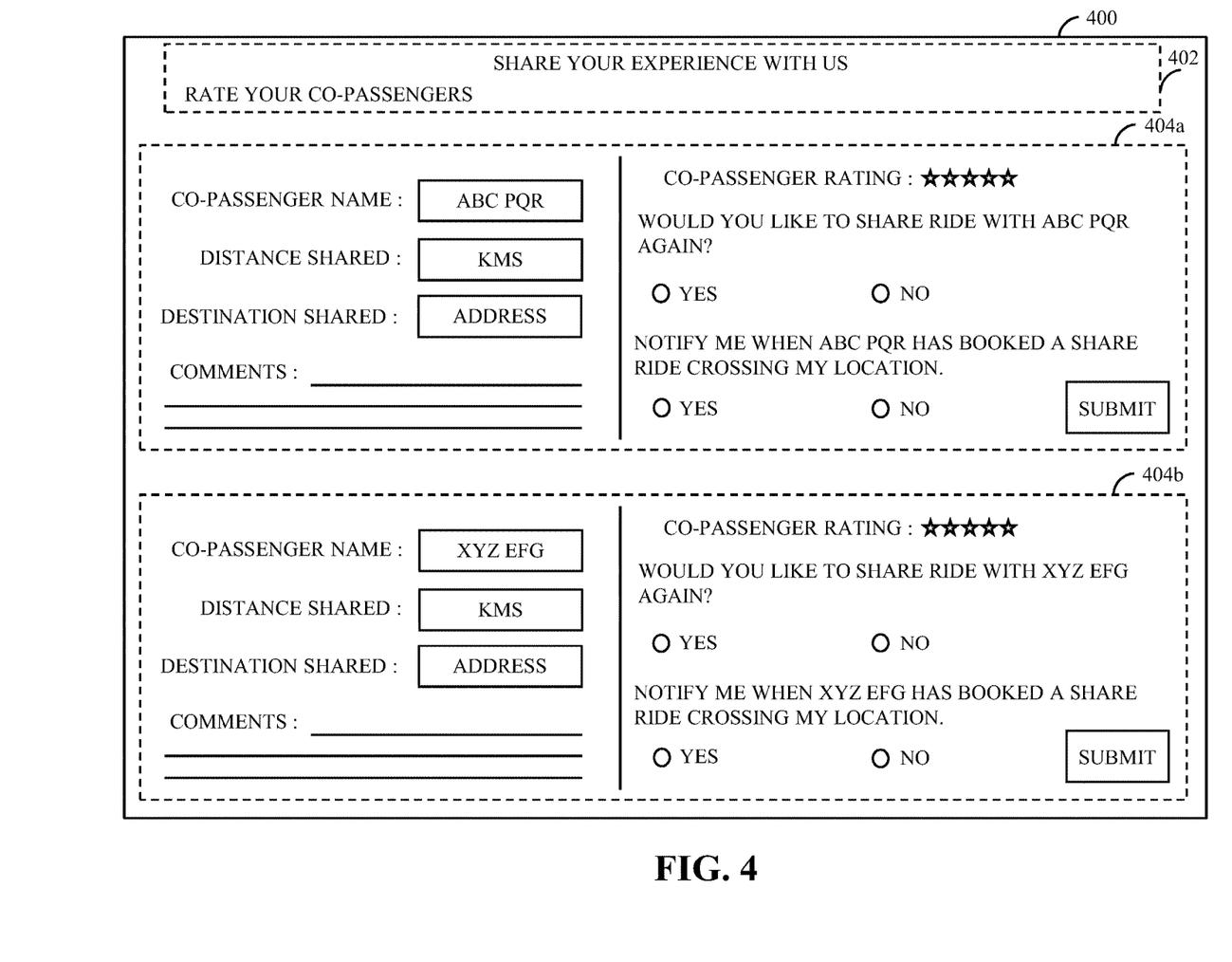
FIG. 4 is a block diagram that illustrates a user interface in a second scenario, in accordance with an embodiment of the present invention.

Referring now to FIG. 4, a block diagram that illustrates a user interface 400 in a second scenario, in accordance with an embodiment of the present invention is shown. In one example, the second scenario arises after the shared-ride ends for the passenger. The second user interface 400 includes one or more sections, such as a title 402, a first allocated co-passenger information section 404a, and a second allocated co-passenger information section 404b.

The first allocated co-passenger information section 404a includes a name, a distance shared by the passenger with the first allocated co-passenger, a destination address of the first allocated co-passenger and other shared-ride details. In an embodiment, the first allocated co-passenger is the first identified co-passenger. The first allocated co-passenger information section 404a further includes a comment section for the passenger to enter comments about the first allocated co-passenger. The first allocated co-passenger information section 404a also includes a co-passenger rating section. The passenger rates the first allocated co-passenger in the co-passenger rating section. In an embodiment, the co-passenger rating section includes a five-star rating scale. The first allocated co-passenger information section 404a further includes various preference questions. The preference questions include whether the passenger wishes to travel with the first allocated co-passenger in the future and whether the passenger wishes to be notified when the first allocated co-passenger books a ride along the route of the passenger's address. To answer each preference question, the first allocated co-passenger information section 404a provides corresponding yes and no tabs. The yes and no tabs are selectable by the passenger and allow the passenger to answer each preference question. The first allocated co-passenger information section 404a further includes a first 'submit' tab. The first 'submit' tab is selectable by the passenger and allows the passenger to submit passenger inputs and preferences from the first allocated co-passenger information section 404a to the second processor 216. The second allocated co-passenger information section 404b is similar in nature and functionality as that of the first allocated co-passenger information section 404a, and further description thereof is avoided so as not to obfuscate the present specification.

Figure 5A:
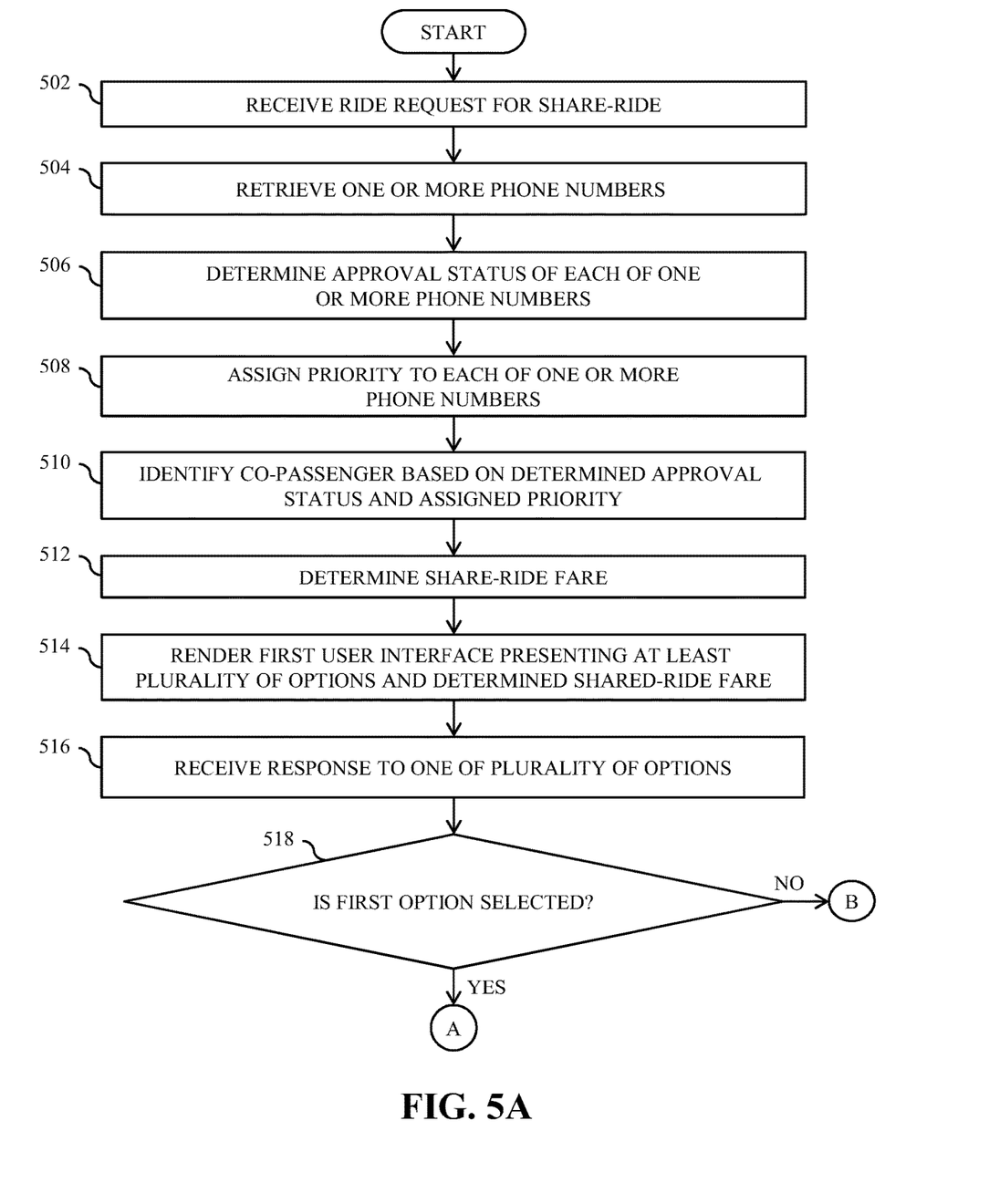
FIGS. 5A and 5B, collectively, are a flow chart that illustrate a method for allocating co-passengers in a ride-sharing system, in accordance with an embodiment of the present invention.
Figure 5B:
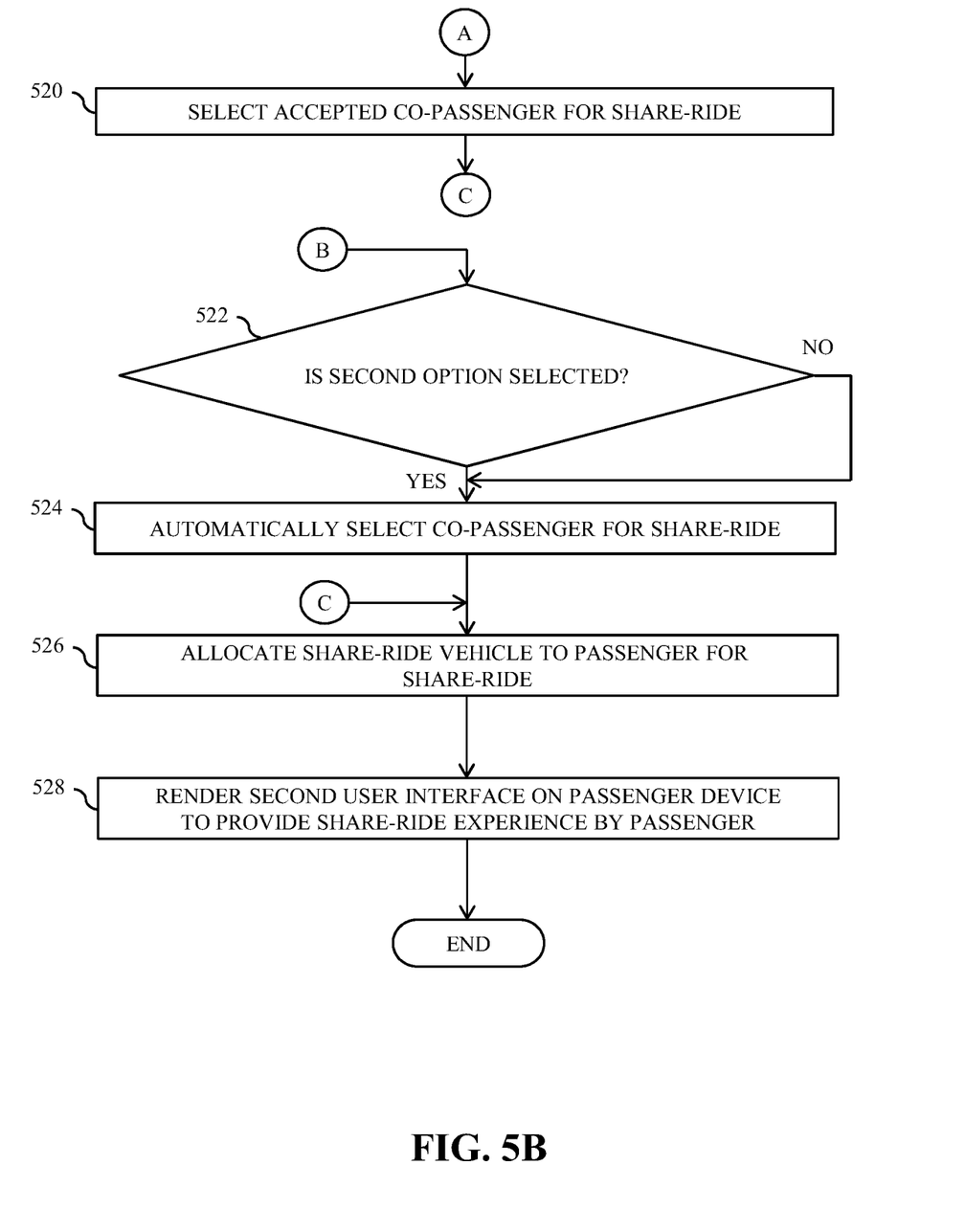

FIGS. 5A and 5B collectively are flow charts that illustrate a method for allocating co-passengers in a ride-sharing system, in accordance with an embodiment of the present invention. At step 502, the ride request, i.e., the first request for the shared-ride is received. The second processor 216 receives the ride request by way of the second transceiver 218 over the communication network 110. In one example, Andy is a passenger who transmits the shared-ride request from his device.

At step 504, the phone numbers of the individuals associated with the first passenger are retrieved. The second processor 216 retrieves the phone numbers from the database server 106 or the passenger device 102. The second processor 216 further retrieves the other details associated with the phone numbers from the database server 106 or the passenger device 102. In an embodiment, the second processor 216 retrieves the phone numbers and the other details in real-time. The second processor 216 further retrieves the historical shared-ride data of the individuals, when travelling with the passenger in past shared-rides from the database server 106. In the example, Bryan and Cam are Andy's friends and their phone numbers are stored on Andy's device. Bryan and Cam transmit the share-ride request at the same time as Andy and the destination addresses of Andy, Bryan and Cam are along one route. The second processor 216 retrieves Bryan's and Cam's phone numbers and the other details from the Andy's device. The second processor 216 further retrieves, from the database server 106, the historical shared-ride data of Bryan and Cam when they have shared a ride with Andy.

At step 506, the approval status of each phone number is determined. The second processor 216 determines the approval status based on an approval message provided by the passenger, corresponding to the phone numbers. In an embodiment, the second processor 216 displays each phone numbers and names of the individual associated with the phone number on the passenger device 102 and provides options to the passenger to approve or disapprove the individuals. In another embodiment, the passenger manually provides a list of approved individuals using the service application. In the example, the second processor 216 determines the approval status of Bryan and Cam by displaying the Bryan's and Cam's phone numbers and their names on the Andy's device. Andy also has options to either approve or disapprove Bryan and Cam.

At step 508, the priority to each phone number is assigned. The second processor 216 determines weights for each phone number. The second processor 216 determines the weights based on the other details associated with the phone numbers and the historical shared-ride data retrieved from the database server 106. Further, the second processor 216 assigns the priority to each phone number based on the corresponding weight. In one example, a phone number having the highest value of weight is assigned the highest priority. In another example, a phone number having the lowest value of weight is assigned the highest priority.

At step 510, a co-passenger is identified based on the determined approval status or the assigned priority of the phone number associated with the co-passenger. The second processor 216 identifies the co-passenger from the individuals. In an embodiment, the second processor 216 identifies a first phone number having the highest assigned priority. The second processor 216 further determines if the passenger has approved an individual associated with the phone number by checking the approval message. If the passenger has approved the individual, the second processor 216 identifies the individual as a co-passenger. If the passenger has disapproved the individual, the second processor 216 rejects the individual and repeats the above-mentioned process for another phone number having the second highest assigned priority. In an embodiment, the second processor 216 uses the above-mentioned process to identify two co-passengers. In another embodiment, the second processor 216 uses the above-mentioned process to identify three or more co-passengers.

At step 512, the shared-ride fare is determined. The second processor 216 determines the shared-ride fare for the passenger based on the other details associated with the phone number of the co-passenger and the historical shared-ride data of the co-passenger when travelling with the passenger in past shared-rides retrieved from the database server 106. For example, for two identified co-passengers, if a phone number of a first co-passenger has a higher weight as compared to a phone number of a second co-passenger, the determined shared-ride fare for the passenger when travelling with the first co-passenger is higher as compared to that with the second co-passenger. In the example, the determined shared-ride fare for Andy to travel with Bryan may be more as compared to the determined shared-ride fare for Andy to travel with Cam.

At step 514, the first user interface 300 is rendered on the display 208 of the passenger device 102. The first user interface 300 presents the determined shared-ride fare and various options selectable by the passenger. The options include the first or second 'accept' tabs 312a and 312b to accept the identified co-passenger for the shared-ride. The options further include the 'skip' tab 316 to execute an automatic allocation of the co-passenger for the shared-ride. When the passenger selects one of the options and based on the selection, the second request is transmitted to the second processor 216. In the example, Andy may select the first 'accept' tab 312a to accept Bryan. In another example, Andy may select the second 'accept' tab 312b to accept Cam. In yet another example, Andy may select the 'skip' tab if Andy does not wish to travel with Bryan and Cam.

At step 516, the second request is received by way of the second transceiver 218 over the communication network 110. The second processor 216 processes the second request to determine the option selected by the passenger. Based on the selected option, the second processor 216 performs one or more defined operations. In the example, the second processor 216 receives the option selected by Andy.

At step 518, the second processor 216 checks if either of the 'accept' tabs 312a and 312b is selected by the passenger. When either of the 'accept' tabs 312a and 312b is selected, step 520 is executed. When none of the 'accept' tabs 312a and 312b is selected, step 522 is executed.

At step 520, the accepted co-passenger for the shared-ride is selected and allocated. After the execution of step 520, step 526 is executed. In the example, Bryan is allocated as the co-passenger for the shared-ride. In another example, Cam is allocated as the co-passenger for the shared-ride.

At step 522, the second processor 216 checks if the 'skip' tab 316 is selected by the passenger. When the 'skip' tab 316 is selected, step 524 is executed. When the 'skip' tab 316 is not selected, step 524 is executed. In an exemplary embodiment, when the passenger does not select any option for a predetermined duration of time, the second processor 216 executes step 524.

At step 524, the second processor 216 automatically selects and allocates the co-passenger for the shared-ride. In an embodiment, the second processor 216 allocates the co-passenger from the identified co-passengers. In another embodiment, the second processor 216 allocates the co-passenger from the individuals. In yet another embodiment, the second processor 216 allocates the co-passenger from a random set of individuals.

At step 526, the shared-ride vehicle is allocated. The second processor 216 allocates the shared-ride vehicle from one or more available vehicles. The second processor 216 further transmits the allocation information of the allocated passenger and the allocated shared-ride vehicle for the shared-ride to the passenger device 102.

At step 528, the second user interface 400 is rendered on the display 208 of the passenger device 102. The second user interface 400 presents the electronic feedback document for receiving passenger's feedback about the shared-ride.

Figure 6:
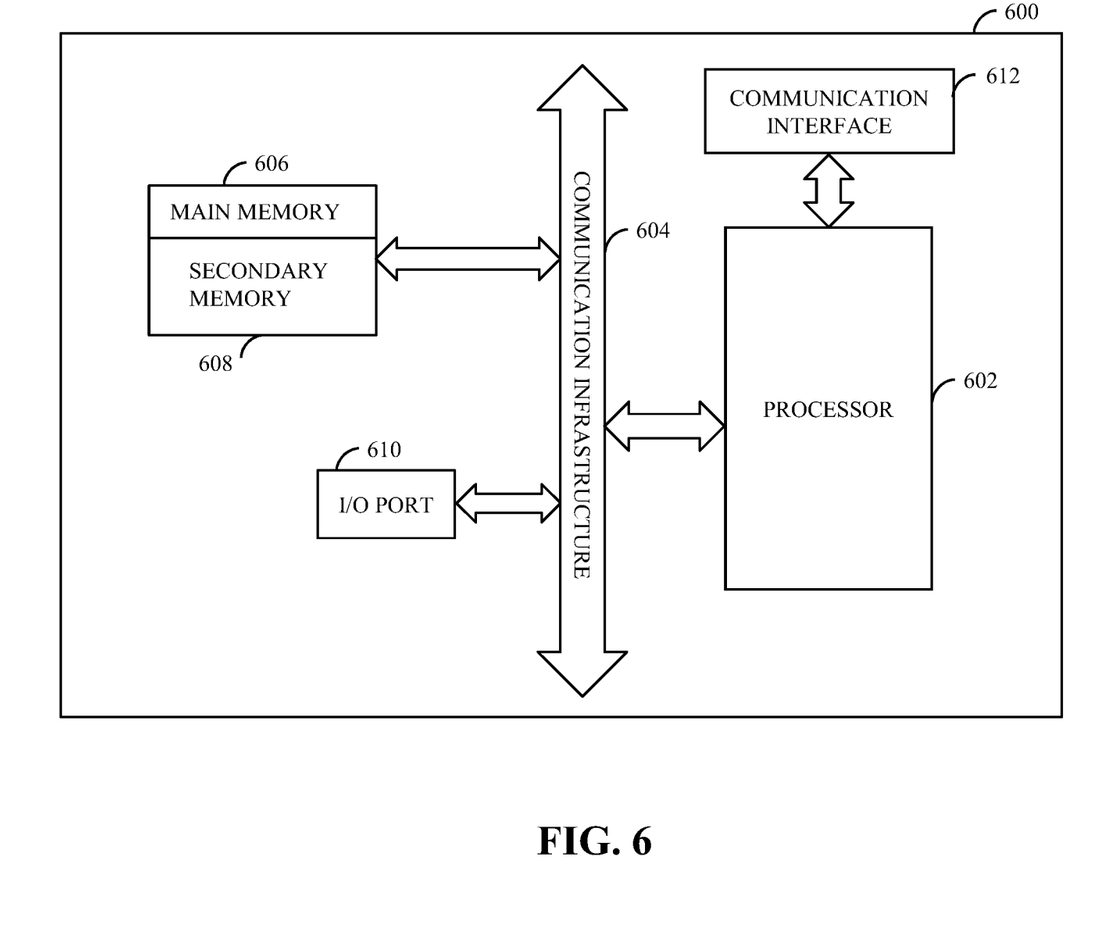
FIG. 6 is a block diagram that illustrates a computer system for allocating co-passengers in a ride-sharing system, in accordance with an embodiment of the present invention.

Referring now to FIG. 6, a block diagram that illustrates a computer system 600 for allocating co-passengers in a ride-sharing system is shown, in accordance with an embodiment of the present invention. An embodiment of the present invention, or portions thereof, may be implemented as computer readable code on the computer system 600. In one example, the database server 106 and the application server 108 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5A and 5B.

The computer system 600 includes a processor 602 that may be a special purpose or a general-purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, the communication network 110, multi-core message-passing scheme, and the like. The computer system 600 further includes a main memory 606 and a secondary memory 608. Examples of the main memory 606 may include random-access memory (RAM), read-only memory (ROM), and the like. The secondary memory 608 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 600 further includes an input/output (I/O) port 610 and a communication interface 612. The I/O port 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communications port, and the like. Data transferred via the communication interface 612 may be signals, such as electronic, electromagnetic, optical, or other signals as will be apparent to a person skilled in the art. The signals may travel via a communications channel, such as the communication network 110 which may be configured to transmit the signals to the various devices that are communicatively coupled to the computer system 600. Examples of the communication channel may include, but not limited to, cable, fiber optics, a phone line, a cellular phone link, a radio frequency link, a wireless link, and the like.

Computer program medium and computer usable medium may refer to memories, such as the main memory 606 and the secondary memory 608, which may be a semiconductor memory such as dynamic RAMs. These computer program mediums may provide data that enables the computer system 600 to implement the methods illustrated in FIGS. 5A and 5B. In an embodiment, the present invention is implemented using a computer implemented application. The computer implemented application may be stored in a computer program product and loaded into the computer system 600 using the removable storage drive or the hard disc drive in the secondary memory 608, the I/O port 610, or the communication interface 612.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 602, and a memory, such as the main memory 606 and the secondary memory 608, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Specific advantages of the method and the system include allocation of the co-passenger and the shared-ride vehicle based on the phone numbers on the passenger device 102. Thus, the shared-ride experience becomes enjoyable as the passenger travels with family, friends, or acquaintances. The method further provides a selection option to the passenger and other details associated with the co-passenger. The passenger makes an informed decision about selection of the co-passenger. Thus, the method and the system provide an efficient way of improving the shared-ride experience of the passenger in the shared-ride.

Techniques consistent with the present invention provide, among other features, systems and methods for allocating co-passengers in a ride-sharing system. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method comprising:

receiving, by circuitry via a communication network, a ride request for a shared-ride from a passenger device of a passenger;

retrieving, by the circuitry via the communication network, one or more phone numbers of one or more individuals associated with the passenger from at least one of a storage server or the passenger device;

determining, by the circuitry, an approval status of each of the one or more phone numbers, wherein the approval status is determined based on an approval message corresponding to the one or more phone numbers provided by the passenger;

assigning, by the circuitry, a priority to each of the one or more phone numbers based on a corresponding weight, wherein a weight corresponding to a phone number from the one or more phone numbers is determined based on a plurality of factors associated with the passenger and an individual associated with the phone number, wherein the plurality of factors comprises at least a frequency of historical calls between the passenger and the individual before receiving the ride request for the shared-ride and a time duration of the historical calls;

identifying, by the circuitry, the individual from the one or more individuals as a co-passenger for the shared-ride based on at least the determined approval status and the assigned priority of the phone number associated with the individual;

determining, by the circuitry, a shared-ride fare for the passenger for the shared-ride with the identified co-passenger based on the plurality of factors associated with the passenger and the identified co-passenger; and rendering, by the circuitry, a first user interface on the passenger device, wherein the first user interface presents shared-ride information of the shared-ride comprising at least a time duration for which the passenger and the identified co-passenger are required to travel together in the shared-ride, a destination address of the identified co-passenger, and the determined shared-ride fare.

2. The method of claim 1, wherein the one or more phone numbers are retrieved from at least one of the storage server or the passenger device in real-time based on the received ride request.

3. The method of claim 1, wherein the one or more individuals associated with the passenger correspond to at least one of one or more friends, one or more family members, or one or more acquaintances of the passenger.

4. The method of claim 1, wherein the plurality of factors associated with the passenger and the individual further comprises at least one of a number of historical rides travelled together or a distance of the number of historical rides.

5. The method of claim 1, wherein the shared-ride information of the shared-ride further comprises at least one of a time duration and a distance for which the identified co-passenger had travelled with the passenger, a most recent time for which the identified co-passenger had travelled with the passenger, or a most recent synchronization of historical calls between the passenger and the identified co-passenger.

6. The method of claim 1, wherein the first user interface further presents a plurality of options including at least first and second options, wherein
the first option is selectable by the passenger to accept the identified co-passenger for the shared-ride, and
the second option is selectable by the passenger to execute an automatic allocation for the shared-ride.

7. The method of claim 6, further comprising receiving, by the circuitry from the passenger device via the communication network, a response corresponding to selection of one of the first and second options by the passenger.

8. The method of claim 7, further comprising allocating, by the circuitry, a shared-ride vehicle to the passenger for the shared-ride requested by the passenger based on the received response, wherein the identified co-passenger is allocated for the shared-ride when the received response indicates selection of the first option by the passenger.

9. The method of claim 1, further comprising rendering, by the circuitry, a second user interface on the passenger device, wherein the second user interface presents an electronic feedback document for receiving the passenger's feedback of the shared-ride availed by the passenger using an allocated shared-ride vehicle.

10. The method of claim 9, wherein the electronic feedback document includes at least a first allocated co-passenger information section and a second allocated co-passenger information section, wherein,
the first allocated co-passenger information section includes a distance shared by the passenger with a first allocated co-passenger and at least one of a name of the first allocated co-passenger, a destination address of the first allocated co-passenger, or a co-passenger rating section, and
the second allocated co-passenger information section includes a distance shared by the passenger with a second allocated co-passenger and at least one of a name of the second allocated co-passenger, a destination address of the second allocated co-passenger, or the co-passenger rating section.

11. The method of claim 1, further comprising displaying, by the circuitry, the one or more phone numbers and one or more names of the one or more individuals on the passenger device after retrieving the one or more phone numbers from at least one of the storage server or the passenger device, wherein the approval message is provided by the passenger based on the displayed one or more phone numbers and the displayed one or more names of the one or more individuals.

12. The method of claim 1, wherein the determined approval status of the phone number associated with the individual indicates an approval of the individual by the passenger for the shared-ride, and wherein the assigned priority of the phone number associated with the individual indicates a priority that is higher than a priority of each of remaining individuals approved by the passenger for the shared-ride.

13. A system comprising:
circuitry configured to:
receive a ride request for a shared-ride from a passenger device of a passenger via a communication network;
retrieve one or more phone numbers of one or more individuals associated with the passenger from at least one of a storage server or the passenger device via the communication network;
determine an approval status of each of the one or more phone numbers, wherein the approval status is determined based on an approval message, provided by the passenger, that corresponds to the one or more phone numbers;
assign a priority to each of the one or more phone numbers based on a corresponding weight, wherein a weight of a phone number from the one or more phone numbers is determined based on a plurality of factors associated with the passenger and an individual associated with the phone number, wherein the plurality of factors comprises at least a frequency of historical calls between the passenger and the individual before receipt of the ride request for the shared-ride and a time duration of the historical calls;
identify the individual from the one or more individuals as a co-passenger for the shared-ride based on at least the determined approval status and the assigned priority of the phone number associated with the individual;
determine a shared-ride fare for the passenger for the shared-ride with the identified co-passenger based on the plurality of factors associated with the passenger and the identified co-passenger; and
render a first user interface on the passenger device, wherein the first user interface presents shared-ride information of the shared-ride that comprises at least a time duration for which the passenger and the identified co-passenger are required to travel together in the shared-ride, a destination address of the identified co-passenger, and the determined shared-ride fare.

14. The system of claim 13, wherein the plurality of factors associated with the passenger and the individual further comprises at least one of a number of historical rides travelled together or a distance of the number of historical rides.

15. The system of claim 13, wherein the shared-ride information of the shared-ride further comprises at least one of a time duration and a distance for which the identified co-passenger had travelled with the passenger, a most recent time for which the identified co-passenger had travelled with the passenger, or a most recent synchronization of historical calls between the passenger and the identified co-passenger.

16. The system of claim 13, wherein the first user interface further presents a plurality of options that includes at least first and second options, wherein
the first option is selectable by the passenger to accept the identified co-passenger for the shared-ride, and
the second option is selectable by the passenger to execute an automatic allocation for the shared-ride.

17. The system of claim 16, wherein the circuitry is further configured to receive, from the passenger device via the communication network, a response that corresponds to selection of one of the first and second options by the passenger.

18. The system of claim 17, wherein the circuitry is further configured to allocate a shared-ride vehicle to the passenger for the shared-ride requested by the passenger based on the received response, wherein the identified co-passenger is allocated for the shared-ride when the received response indicates selection of the first option by the passenger.

19. The system of claim 13, wherein the circuitry is further configured to render a second user interface on the passenger device, wherein the second user interface presents an electronic feedback document to receive the passenger's feedback of the shared-ride ride availed by the passenger by use of an allocated shared-ride vehicle.

20. The system of claim 19, wherein the electronic feedback document includes at least a first allocated co-passenger information section and a second allocated co-passenger information section, wherein,
the first allocated co-passenger information section includes a distance shared by the passenger with a first allocated co-passenger and at least one of a name of the first allocated co-passenger, a destination address of the first allocated co-passenger, or a co-passenger rating section, and
the second allocated co-passenger information section includes a distance shared by the passenger with a second allocated co-passenger and at least one of a name of the second allocated co-passenger, a destination address of the second allocated co-passenger, or the co-passenger rating section.

* * * * *